(12) United States Patent
Johnson

(10) Patent No.: US 7,987,817 B2
(45) Date of Patent: Aug. 2, 2011

(54) METHOD AND APPARATUS FOR PET WATER DRINKING DEVICE

(76) Inventor: Misty Johnson, Dallas, TX (US)

( * ) Notice: Subject to any disclaimer, the term of this patent is extended or adjusted under 35 U.S.C. 154(b) by 147 days.

(21) Appl. No.: 12/322,249

(22) Filed: Jan. 30, 2009

(65) Prior Publication Data
US 2009/0194032 A1 Aug. 6, 2009

Related U.S. Application Data

(63) Continuation-in-part of application No. 12/012,131, filed on Jan. 31, 2008, now abandoned.

(51) Int. Cl.
*A01K 7/00* (2006.01)

(52) U.S. Cl. .......................................... 119/74; 222/108

(58) Field of Classification Search .............. 119/74, 119/77, 72, 72.5, 73, 78, 79, 80, 75; 285/272, 285/275, 276, 278, 280; 220/571, 575, 574, 220/703; 222/108
See application file for complete search history.

(56) References Cited

U.S. PATENT DOCUMENTS

| | | | | |
|---|---|---|---|---|
| 1,184,773 | A * | 5/1916 | Rasmussen | 119/75 |
| 1,231,073 | A * | 6/1917 | Schwertfeger | 119/75 |
| 1,337,636 | A * | 4/1920 | Bogda | 119/75 |
| 1,372,213 | A | 3/1921 | Williams | |
| 1,524,484 | A | 1/1925 | Lutz | |
| 1,652,046 | A * | 12/1927 | Rassmann | 119/75 |
| 1,738,300 | A * | 12/1929 | Klinzing | 119/75 |
| 2,220,421 | A * | 11/1940 | Munson | 119/75 |
| 2,700,370 | A * | 1/1955 | Goff | 119/74 |
| 2,749,882 | A | 6/1956 | Butker | |
| 2,848,013 | A * | 8/1958 | Kofford | 137/408 |
| 3,831,558 | A | 8/1974 | Forbes | |
| 3,952,706 | A * | 4/1976 | Hart | 119/75 |
| 3,983,844 | A * | 10/1976 | Hart | 119/75 |
| 4,205,402 | A | 6/1980 | Miller | |
| 4,221,188 | A * | 9/1980 | Hostetler | 119/72 |
| 4,476,812 | A * | 10/1984 | Dube et al. | 119/75 |
| 4,630,569 | A | 12/1986 | Dieleman | |
| 4,656,970 | A * | 4/1987 | Hostetler | 119/75 |
| 4,771,736 | A * | 9/1988 | Carmien | 119/75 |
| 4,924,812 | A | 5/1990 | Bernays, Jr. | |
| 6,202,594 | B1 | 3/2001 | Kirschner | |
| 6,279,508 | B1 | 8/2001 | Marchant et al. | |
| 6,332,428 | B1 * | 12/2001 | Li et al. | 119/75 |
| 6,526,916 | B1 | 3/2003 | Perlsweig | |
| 7,089,881 | B2 | 8/2006 | Plante | |
| 2007/0095297 | A1 | 5/2007 | Boyd | |

FOREIGN PATENT DOCUMENTS

JP 20010090126 4/2001

\* cited by examiner

*Primary Examiner* — Kimberly S Smith
*Assistant Examiner* — Joshua Huson
(74) *Attorney, Agent, or Firm* — Baker & Daniels LLP

(57) ABSTRACT

A device capable of diverting, redirecting, and collecting fresh water from a faucet to a pet for drinking. The device includes a plurality of elbows and a reservoir with a faceplate or a reservoir connected to the faucet by use of a connection piece. The device includes extensions which allow the user to position the reservoir at a desired height and distance from the faucet. The device further includes a plurality of designs for the reservoir and faceplate that allow for different water flows from which the pet can drink. The chosen reservoir and faceplate can be changed by the user. A method for having multiple reservoirs and faceplates connected to a single faucet allowing multiple pets to drink at a time is also disclosed.

14 Claims, 11 Drawing Sheets

METHOD AND APPARATUS FOR PET WATER DRINKING DEVICE

CROSS-REFERENCE TO RELATED APPLICATIONS

This application is a Continuation-In-Part claiming priority benefit from U.S. patent application Ser. No. 12/012,131 entitled "Method and Apparatus for Pet Water Drinking Device" filed on Jan. 31, 2008 now abandoned.

FIELD OF THE INVENTION

The present invention relates to a method and device for assisting animals to drink directly from a faucet.

BACKGROUND OF THE INVENTION

Due to numerous statutes, code provisions, restrictions, and liability issues, pets are typically confined to the homes of their owners and are not allowed to roam free in yards, neighborhoods and streets. Due to these restrictions, it is necessary for the pets to have access to fresh water source that is both safe and accessible.

Most often fresh water is available through the faucets. However, the downward flow of a common faucet does not facilitate pets drinking.

The most common means of supplying water for the pets to drink is through bowls or cups which are filled by the pet's owners and left to sit. This method leaves the water stagnant and accessible to debris causing the water to become contaminated.

Another method for supplying water to the pets is through the use of self-contained systems that have a water containment device, such as a bottle, and a pump to allow the water to circulate from the bottle to the bowl. This method allows for the movement of water but is also accompanied by pump noise and the water can also become contaminated.

Furthermore, the inventor has observed that pets prefer drinking from moving water compared to water that is still. The prior art does not provide a source of moving water easily available inside the home.

The present invention attaches to the faucet in the home and redirects the water flow to a direction that allows the pet to drink fresh water without becoming wet themselves and without the water becoming contaminated. It further allows for differing flow patterns for the water which allows the individual pets to choose which flow pattern they enjoy most.

In U.S. Pat. No. 1,372,213 by Williams, entitled Drinking Fountain Attachment for Bibbs or Faucets, the invention disclosed has an attachment to a faucet which requires constant application of force by the user to redirect water upward through the device in order to drink. While this works for humans, it does not function for pets because they lack the dexterity necessary to apply the constant force necessary.

In U.S. Pat. No. 1,524,484 by Lutz, entitled Combined Faucet and Drinking Fountain, the invention disclosed has an attachment to a faucet that redirects water upward for drinking. However, in order for the water to flow upward, pressure must be applied to the invention to open the valve and allow the water to flow. If the force on the device is removed, the water ceases to flow. A pet would not be able to operate this device due to the dexterity required.

SUMMARY OF THE INVENTION

The present invention addresses the need for supplying fresh flowing water to a pet to drink from a faucet that prevents the pet from becoming wet in the process.

Accordingly, an embodiment of the present invention provides an elbow connection, one end connected to a faucet and the other end connected to a second elbow. The second elbow is connected to a reservoir. The reservoir has a faceplate from the surface of which the animal drinks the water.

In one embodiment, the elbows and reservoir are connected together through threadings.

In another embodiment, the first and second elbows are manufactured as a single piece and the reservoir is connected through a locking means.

In another embodiment, the elbows and reservoir are connected through a locking means between the pieces. The pieces are separated by o-ring seals to prevent leaking. The embodiment is held in place against the faucet spout through the use of a strap that fits over the faucet and is locked in place. The strap is positioned by being placed in an indention on the bottom of an elbow. The elastic strap is located at an angle relative to the vertical axis of the faucet.

In another embodiment, a telescopic extension is located between the two elbows and allows the user the change the distance between the reservoir and the faucet. This accommodates the differences in size for different pets because some pets can comfortably reach farther into the sink than other pets.

In another embodiment, a vertical extension is located between the faucet and the first elbow. The vertical extension may be provided in different lengths and allows for the invention to be located at different distances from the faucet. This accommodates different heights of faucets and pets.

In another embodiment, the second elbow can be bent to a desired position and angle and maintain that position until the pet's owner decides to change the angle or position of the reservoir connected to the elbow.

In use, when the water flows from the faucet through the elbows, through the reservoir, and out the faceplate, it reaches the edge of the faceplate and drips into the sink below the faucet. The dripping water allows the pet to drink from a natural position.

In another embodiment of the present invention, different number and arrangements of holes can be arranged on faceplate to allow for differing water patterns.

In another embodiment, the faceplate has slots, in differing arrangements, located on the walls of the reservoir to allow the water to flow horizontally from the spout.

In another alternative embodiment, one end of a "T" connection is attached to the second elbow and the remaining two ends of the "T" connection is attached to a third elbow. Attached to each of the elbows are reservoirs and respective faceplates. This allows for more than one reservoir to be connected to a single faucet and allows more than one pet to drink at the same time. It also allows for a multi-pet household to have different reservoirs with different faceplates for each of the pets according to the particular pet's preference.

In another embodiment, a reservoir can be connected to a faucet to allow the pet to drink. The reservoir is removable from the faucet when not in use and can be disassembled for cleaning.

DETAILED DESCRIPTION OF THE PREFERRED EMBODIMENT

Figure 1:
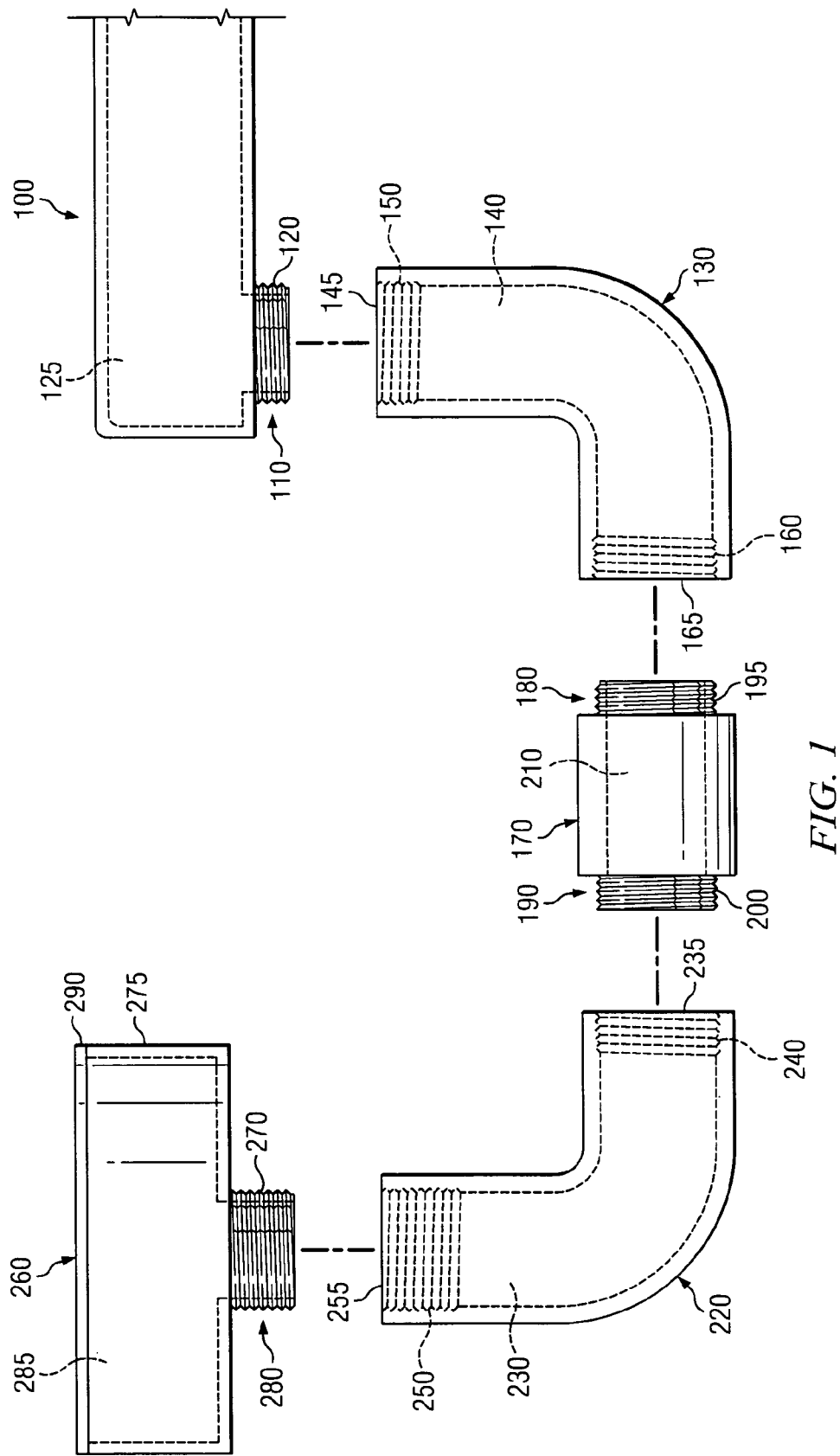
FIG. 1 is an exploded view of a preferred embodiment of the present invention.

In the descriptions that follow, like parts are marked throughout the specification and drawings with the same numerals. The drawing figures are not necessarily drawn to scale and certain figures may be shown in exaggerated or generalized form in the interest of clarity and conciseness.

Referring to FIG. 1, faucet 100 is a typical water faucet located in a home with either a bathroom or kitchen sink. Faucet 100 has channel 125. Channel 125 traverses the length of faucet 100. Channel 125 bends with the curves of faucet 100. Faucet 100 has spout 110. The exterior of spout 110 has threads 120. Channel 125 extends through spout 110.

Elbow 130 has channel 140 which traverses the length of elbow 130. Elbow 130 has a bend that is approximately 90°.

Channel 140 has two ends, entrance 145 and exit 165. Channel 140 has threads 150 and threads 160. Threads 150 have similar set spacing as threads 120. Threads 150 are located in the wall of channel 140 beginning at entrance 145 and extending inward along the vertical axis of channel 140 for a distance of approximately 0.2 cm to 2 cm. Threads 160 are located in the wall of channel 140 and begin at exit 165. Threads 160 extend inward along the horizontal axis of channel 140 for a distance of approximately 0.2 cm to 2 cm.

Elbow 130 is connected to faucet 100 by advancing threads 150 into threads 120.

Connector 170 has channel 210 which traverses its length. Connector 170 has threaded end 180 and threaded end 190. Threaded end 180 has threads 195 along its outside walls. Threaded end 190 has threads 200 along its outside walls. Connector 170 is connected to elbow 130 by advancing threads 195 into threads 160.

Elbow 220 has channel 230 which traverses its length. Elbow 220 has a bend of approximately 90°. Channel 230 has entrance 235 and exit 255. Entrance 235 and exit 255 are at the two ends of channel 230. Channel 230 has threads 240 and 250. Threads 240 begin at entrance 235 and extend inwardly for a distance of approximately 0.2 cm to 2 cm. Threads 250 begin at exit 255 and extend inwardly for a distance of approximately 0.2 cm to 2 cm.

Elbow 220 is connected to connector 170 by advancing threads 240 onto threads 200. When in place in one embodiment, the vertical axis of elbow 220 will be generally parallel with the vertical axis of elbow 130. In another embodiment, elbow 220 can be rotated approximately 45° to either the right or left of the vertical axis of elbow 130.

Elbow 220 is connected to spout 260. Spout 260 has end 280 and reservoir 275. End 280 has threads 270. Set spacing of threads 270 is approximately the same as threads 250 in channel 230 of elbow 220. Spout 260 is connected to elbow 220 by advancing threads 270 into threads 250.

Spout 260 has channel 285 which traverses the length of spout 260. Cross-section of channel 285 increases respectively with increased cross-section of spout 260 as the cross-section changes from end 280 through reservoir 275.

Spout 260 has faceplate 290 which covers the top of reservoir 275. In one preferred embodiment, faceplate 290 has openings through which the water flows and which allows the pet to drink. Further details regarding different designs for reservoir 275 are discussed later in this specification.

Elbow 130, connector 170, elbow 220, and reservoir 275 can be made from common plumbing materials, including but not limited to acrylonitrile-butadiene-styrene (ABS), polyvinyl-chloride (PVC), galvanized or cast iron, copper, or brass. In the preferred embodiment, elbow 130, connector 170, elbow 220, reservoir 275 will be made from PVC.

The longitudinal cross-section of elbow 130, channel 140, connector 170, threaded end 180 and 190, channel 210, elbow 220, channel 230, and end 280 is circular.

In practice, to begin the flow of water to faucet 100 a valve (not shown) is opened and the water flows through channel 125, through channel 140, through channel 210, through channel 230, through channel 285 and through openings of faceplate 290. As the water flows through faceplate 290, the water is forced upward and out of the faceplate. Plumber's tape or other commercially available plumbing materials can be used between threads 120, 150, 160, 195, 200, 240, 250, and 270 to prevent leaking between the individual components as is known in the art.

Figure 2:
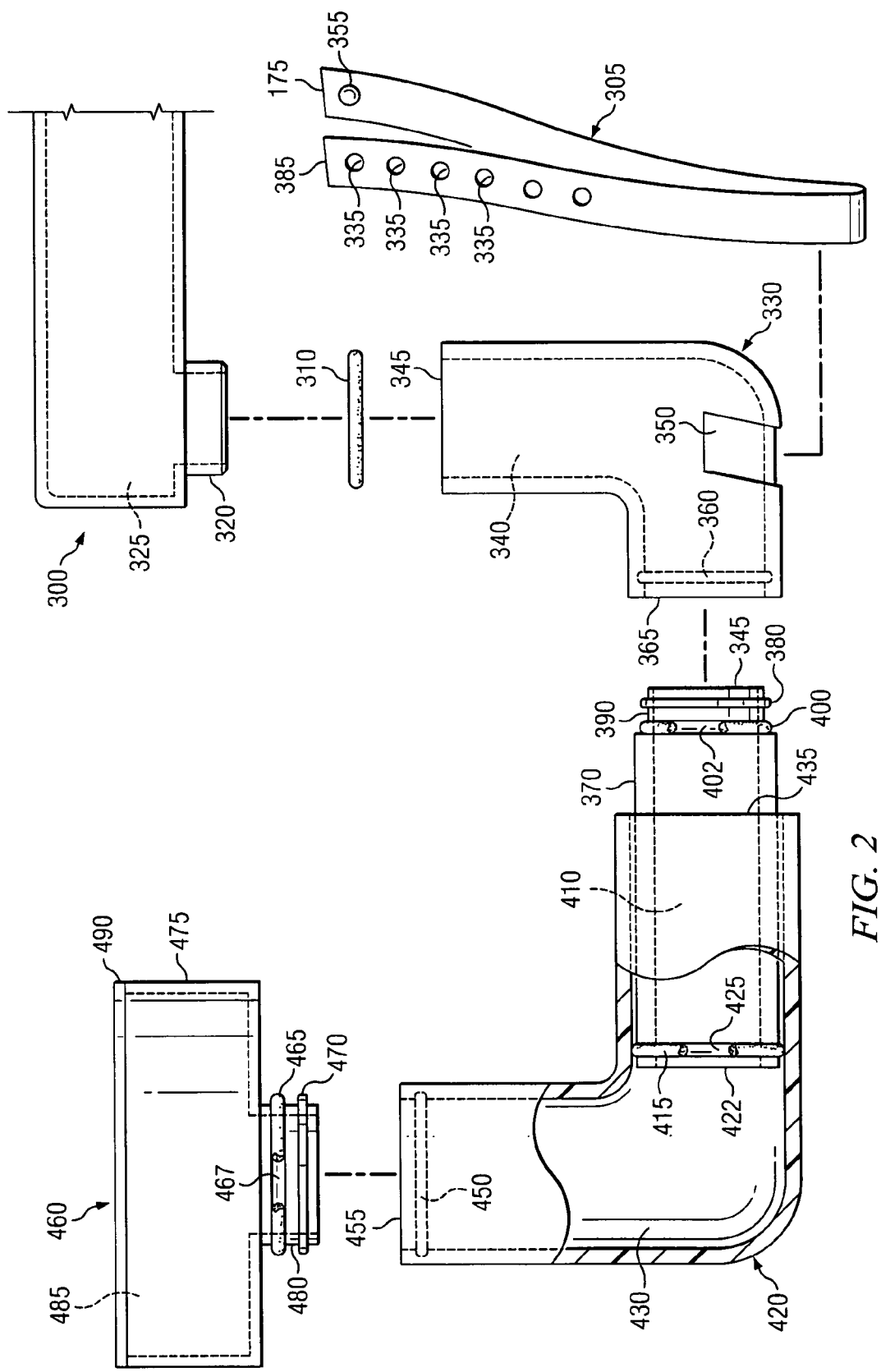
FIG. 2 is an exploded view of another preferred embodiment of the present invention.

FIG. 2 illustrates another preferred embodiment of the present invention. Faucet 300 has channel 325 that traverses the length of faucet 300 and bends similarly to faucet 300. Faucet 300 has spout 320. Spout 320 has smaller cross-section that faucet 300 and typically has circular cross-section. Channel 325 extends through spout 320.

O-ring 310 fits over spout 320. The inside circumference of o-ring 310 is larger than the cross-section of spout 320 but smaller than the cross-section of faucet 300.

Elbow 330 has channel 340 which traverses the length of elbow 330. Channel 340 bends similarly to the bends in elbow 330. Elbow 330 has a bend of approximately 90°.

Elbow 330 has indention 350 which extends semi-circumferentially around elbow 330. Indention 350 is between 1 cm and 3 cm wide. Indention 350 does not intersect with channel 340. The longitudinal axis of indention 350 is at an angle of between 5° and 25° to the vertical axis of faucet 300.

Channel 340 has entrance 345 and exit 365. Along the wall of channel 340 is annular recess 360. Annular recess 360 is between 0.1 cm and 0.5 cm in depth and covers the entire circumference of the wall of channel 340. Annular recess 360 is located between approximately 0.1 cm and 1 cm from exit 365.

Elbow 420 has channel 430 which extends along the entire length of elbow 420. Elbow 420 has a bend of approximately 90°. Channel 430 has exit 455 and entrance 435.

Within channel 430 is telescopic extension 370. Telescopic extension 370 fits within channel 430 beginning at entrance 435 and extending inward. The outside diameter of telescopic extension 370 should be approximately 0.1 mm to 1 mm less than inside diameter of channel 430. The length of telescopic extension 370 is between 1 cm and 15 cm.

Telescopic extension 370 has channel 410 and end 390. Channel 410 transverses the length of telescopic extension 370. End 390 has o-ring 400 and extension 380. O-ring 400 fits in annular groove 402. Diameter of end 390 is between 0.1 mm and 1 mm less than diameter of channel 340 of elbow 330.

Telescopic extension 370 also has terminal end 422 which is located inside channel 430 of elbow 420. Telescopic extension 370 has recess 425 in its outside wall and is located approximately 0.1 cm to 0.5 cm from terminal end 422. Inside recess 425 is o-ring 415. O-ring 415 creates a seal between telescopic extension 370 and wall of channel 430.

In practice, telescopic extension 370 is extended from or retracted into elbow 420 by user until elbow 420 is at the desired distance from faucet 300.

Extension 380 extends around the outside wall of end 390 and fits within annular recess 360 of elbow 330. Extension 380 and o-ring 400 are positioned such that when end 390 is pushed within channel 340, extension 380 locks into annular recess 360 and o-ring 400 creates a seal between elbow 330 and rest of telescope extension 370.

Channel 430 has recess 450 in its wall. Recess 450 is cut around the entire circumference of the wall of channel 430. Recess 450 is located between 0.1 cm and 1 cm from exit 455. Depth of recess 450 is such that it does not intersect with exterior walls of elbow 420 and should be between approximately 0.1 cm and 0.5 cm.

Spout 460 has end 480 and reservoir 475. Reservoir 475 has faceplate 490. Further, spout 460 has channel 485 which extends through reservoir 475 and end 480. The cross-section of channel 485 increases and/or decreases consistent with and in relation to changes in the cross-section of end 480 and reservoir 475.

End 480 has o-ring 465 and extension 470. O-ring 465 fits in annular groove 467. Diameter of end 480 is between 0.01 mm and 1 mm less than diameter of channel 430 of elbow 420. O-ring 465 has interior diameter which fits snugly around outside diameter of end 480. Outside diameter of o-ring 465 is no larger than the outside diameter of elbow 420 but no smaller than the diameter of channel 430.

Extension 470 extends outward from end 480. The length of extension 470 from end 480 is such that it fits within recess 450. The location of recess 450 on elbow 420 is such that when extension 470 is in recess 450, o-ring 465 creates a seal between reservoir 475 and elbow 420.

Reservoir 475 is positioned adjacent end 480. The cross-section of reservoir 475 is generally equal to or larger than cross-section of elbow 420. Faceplate 490 is positioned adjacent reservoir 475. Channel 485 does not extend through faceplate 490. Faceplate 490 covers the surface of reservoir 475.

In practice, end 480 of spout 460 is pushed into channel 430 of elbow 420 until extension 470 is lodged into recess 450. O-ring 465 creates a seal between reservoir 475 and elbow 420.

Elbow 330, telescopic extension 370, elbow 420, and reservoir 475 can be made from acrylonitrile-butadiene-styrene (ABS), poly-vinyl-chloride (PVC), galvanized or cast iron, copper, or brass. In the preferred embodiment, elbow 330, telescopic extension 370, elbow 420, and reservoir 475 will be made from PVC.

The longitudinal cross-section of elbow 330, channel 340, telescopic extension 370, end 390, channel 410, channel 430, elbow 420, and end 480 is circular.

Strap 305 is a flexible runner strip used to secure the invention to the faucet. Strap 305 has end 385 and end 175. Strap 305 has even spaced holes 335. Holes 335 are generally centered along the latitudinal axis on the face of strap 305. The diameter of holes 335 is between 1 mm and 10 mm. Holes 335 are separated at a distance between 1 mm and 10 mm.

Strap 305 includes button 355. FIG. 3c shows illustration of button in one preferred embodiment. Button 355 is a rigid cylindrical stanchion anchored in the surface of strap 305. It extends approximately 0.5 mm to 10 mm from the surface of strap 305. Button 355 includes a reduced diameter neck 354 and head 352. The diameter of head 352 is 0.1 mm to 3 mm larger than the diameter of holes 335. The diameter of neck 354 is approximately 0.1 mm to 2 mm less than the diameter of holes 335.

Referring back to FIG. 2, in practice, end 480 is secured in channel 430 of elbow 420 until extension 470 is located in recess 450 and seal is created by o-ring 465 between elbow 420 and reservoir 475. End 390 is secured in channel 340 until extension 380 is secured in annular recess 360 and o-ring 400 creates a seal between telescopic extension 370 and elbow 330. The o-ring is placed over spout 320 and spout 320 is placed within channel 340 of elbow 330 through entrance 345. Elbow 330 is advanced until a seal is created by o-ring 310 between elbow 330 and faucet 300. To maintain the position of the invention, strap 305 is placed within indention 350 and wrapped around faucet 300. Once desired pressure is being exerted by strap 305, button 355 is pushed into one of holes 335 to maintain the location of strap 305 on faucet 300.

Telescopic extension 370 is then extended until spout 460 is at the desired distance from faucet 300. Elbow 420 can be rotated approximately 45° to either the right or left of the vertical axis of elbow 330 as the user prefers. The faucet valve is opened and allows water to flow through channel 325, channel 340, channel 410, channel 430, channel 485 and faceplate 490. A pet then can drink water flowing through faceplate 490.

Figure 3A:
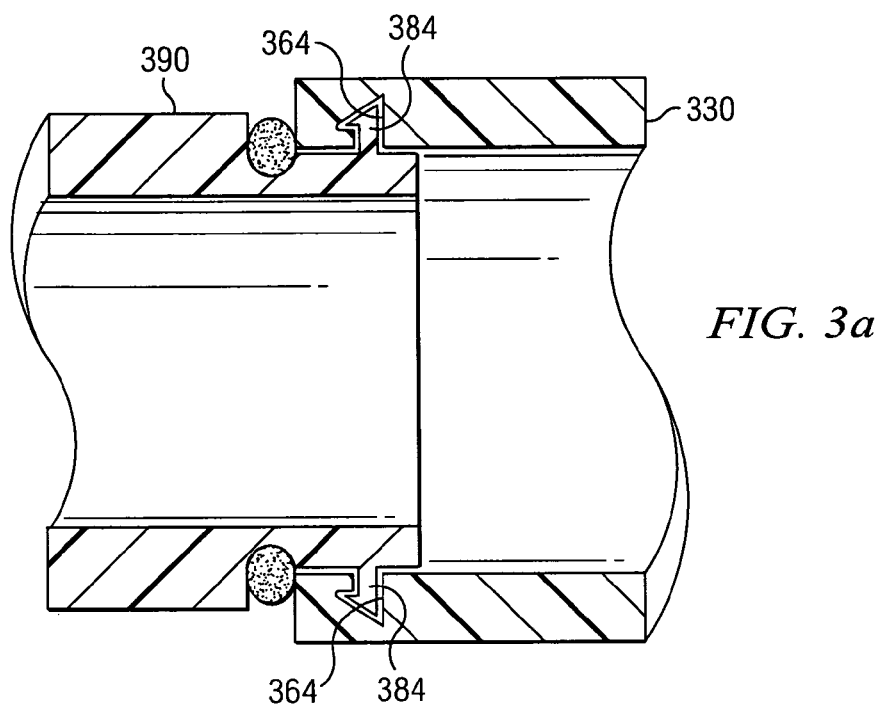
FIG. 3a is a cross-sectional view of connections in a preferred embodiment of the present invention.
Figure 3B:
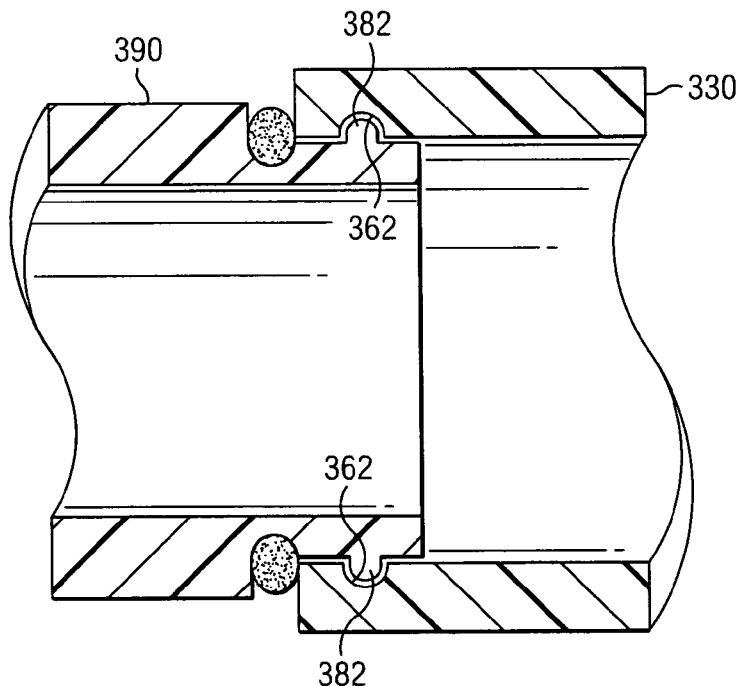
FIG. 3b is a cross-sectional view of connections in a preferred embodiment of the present invention.
Figure 3C:
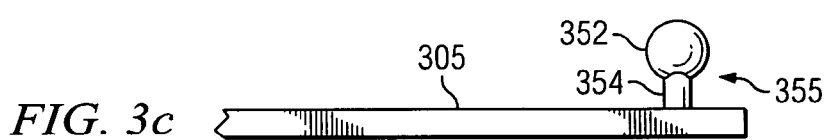
FIG. 3c is a plan view of button on strap in a preferred embodiment of the present invention.

FIGS. 3a and 3b illustrate two different forms of the means provided for connection between annular latch 384 on telescopic extension 390 and annular groove 364 of elbow 330. FIG. 3a includes an annular latch 384 fit within annular receiving groove 364. The dimensions of annular receiving groove 364 are generally between 0.1 mm to 0.2 m larger than annular latch 384. In use, during maintenance, the combination of the annular latch and groove allow telescopic extension 390 to be "snapped" into elbow 330 in a manner that prevents removal, but allows rotation of the two pieces with respect to each other.

In FIG. 3b, a cross-section of elbow 330 and telescopic extension 390 is shown. Annular groove 362 is provided in elbow 330. Annular receiving extension 382 is provided on telescopic extension 390. The combination of the annular extension and annular receiving groove allows for detachable connection of the pieces and rotation while connected.

Referring back to FIG. 2; the connection between extension 470 and recess 450 can take the same form as described in FIGS. 3a and 3b.

Figures 4A, 4B:
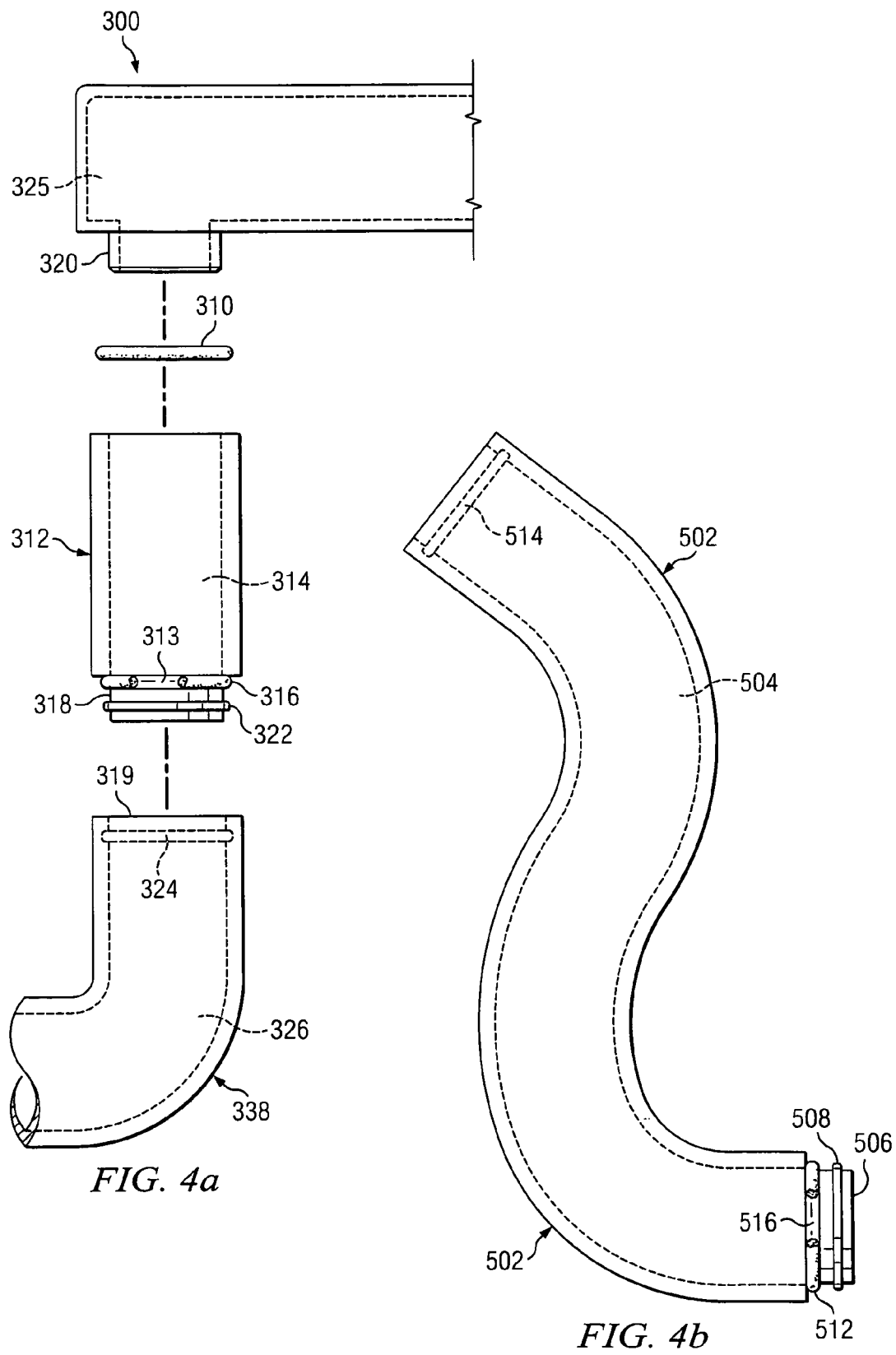
FIG. 4a is an exploded view of extender in another preferred embodiment of the present invention.
FIG. 4b is a plan view of an elbow in another preferred embodiment of the present invention.

Referring to FIG. 4a, in another embodiment, it is desirable to lower the invention from the faucet. In that situation, extender 312 is inserted between faucet 300 and elbow 338. Elbow 338 serves same function as elbow 330 in FIG. 2.

Elbow 338 has channel 326, entrance 319, and recess 324. Entrance 319 is the beginning of channel 326. Recess 324 extends around the entire circumference of wall of channel 326 and is located between 1 mm to 100 mm from entrance 319. Depth of recess 324 is less than the width of the wall of elbow 338.

Extender 312 has channel 314 and end 318. Channel 314 traverses the length of extender 312.

Diameter of end 318 is between 0.1 mm and 0.5 mm less than diameter of channel 326. End 318 has o-ring 316 and extension 322. O-ring 316 fits in annular groove 313. Internal diameter of o-ring 316 is 0.1 mm to 0.5 mm more than the diameter of end 318. Outside diameter of o-ring 316 is no less than the diameter of channel 326.

Recess 324 is located such that when end 318 is inserted into channel 326 and extension 322 is inserted into recess 324, a seal is created between elbow 338 and extender 312 by use of o-ring 316.

Design of recess 324 and extension 322 can be similar to those described in FIGS. 3a and 3b.

Referring to FIG. 4b, in another embodiment, elbow 502 serves a similar function as elbow 220 (of FIG. 1) and elbow 420 (of FIG. 2). Elbow 502 is constructed from material known in the art to allow elbow 502 to be bent into different positions and angles and hold the desired position after being bent.

Elbow 502 has channel 504. Inside channel 504 is annular groove 514. Annular groove 514 will connect to reservoir 475 (of FIG. 2).

Elbow 502 has end 506 on which is located extension 508 and annular groove 516. Inside annular groove is o-ring 512. Extension 508 is inserted into recess 360 (of FIG. 2).

Figure 4C:
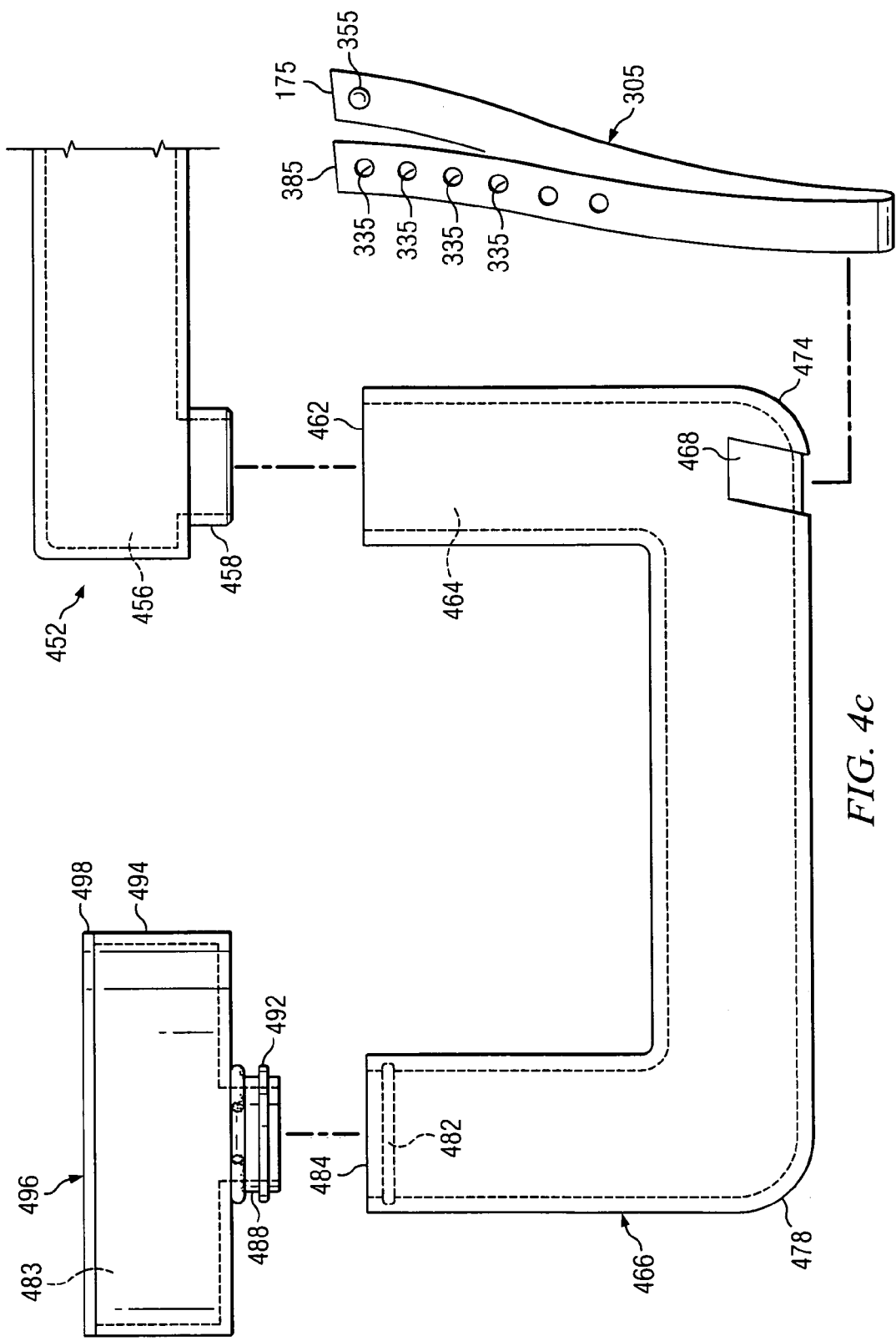
FIG. 4c is an exploded view of another preferred embodiment of the present invention.

FIG. 4c illustrates another preferred embodiment of the present invention. Faucet 452 has channel 456 that traverses the length of faucet 452 and bends similarly with faucet 452. Faucet 452 has spout 458, which has a smaller cross-section than faucet 452. Cross-section of spout 458 is typically circular. Channel 456 extends through spout 458.

Elbow 466 has bends 474 and 478. Bends 474 and 478 have an angle of approximately 90° and give elbow 466 a "U" shape.

Elbow 466 has channel 464 which traverses the length of elbow 466 and bends similarly to bends 474 and 478. Channel 464 has entrance 462 and exit 484. Cross-section of channel 464 is larger than the cross-section of spout 458 but smaller than cross-section of faucet 452.

Channel 464 has annular recess 482 which is between 0.1 cm and 0.5 cm in depth and covers the entire circumference of the wall of channel 464. Annular recess 482 is located between approximately 0.1 cm and 1 cm from exit 484.

Elbow 466 has indention 468 which extends semi-circumferentially around elbow 466. Indention 468 does not intersect with channel 464 and is between 1 cm and 3 cm in width. The longitudinal axis of indention 468 is at an angle of between 5° and 25° to the vertical axis of faucet 452.

Spout 496 has end 488 and reservoir 494. Cross-section of end 488 is between 0.01 mm and 1 mm less than cross-section of channel 464. End 488 has annular extension 492 which extends outward from circumference of end 488. Length of annular extension 492 is such that it fits within annular recess 482.

Reservoir 494 is positioned adjacent to end 488. The cross-section of reservoir 494 is generally equal to or greater than the cross-section of elbow 466. Faceplate 498 is adjacent to reservoir 494.

Spout 496 has channel 483 which traverses end 488 and reservoir 494. The cross-section of channel 483 increases and/or decreases consistent with and in relation to the changes in the cross-section of end 488 and reservoir 494.

In practice, end 488 is pushed into channel 464 until annular extension 492 fits into annular recess 482.

Strap 305 as illustrated in FIGS. 2 and 3c is also used with this embodiment.

In use, spout 458 is inserted into channel 464. Strap 305 is inserted into indention 468. Ends 385 and 175 are pulled over faucet 452 until the desired pressure is being asserted by elbow 466 against faucet 452. Button 355 is inserted through appropriate hole 335 to maintain the pressure.

Owner will open valve (not shown) and allow water to flow through channel 456, through channel 464, through channel 483, and then out faceplate 498 allowing the pet to drink.

Different designs of faceplate 490 and reservoir 475 (of FIG. 2), faceplate 290 and reservoir 275 (of FIG. 1), and faceplate 498 and reservoir 494 (of FIG. 4c) allow for different water flows from which the pet can drink. FIGS. 5a through 5h illustrate alternate designs of reservoirs and their respective faceplates.

Figure 5A:
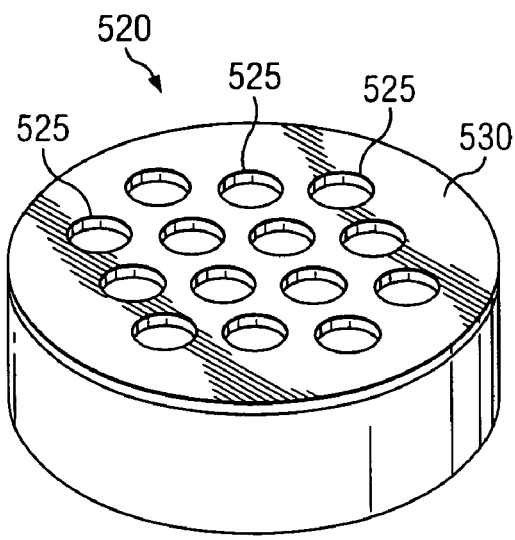
FIG. 5a is an isometric view of a reservoir in a preferred embodiment of the present invention.

FIG. 5a illustrates reservoir 520 with faceplate 530. Faceplate 530 has numerous holes 525. Holes 525 can be arranged in a random pattern or in a pre-determined pattern. Number of holes 525 can range from approximately 2 to 50. The diameter of holes 525 can range between approximately 1 mm to 1 cm. Holes 525 provide an exit path for water and provide an interesting "bubbling" characteristic. The remainder of faceplate 530 allows the water to collect before flowing off of faceplate 530 creating a water "layer" on top of faceplate 530 during use.

Figure 5B:
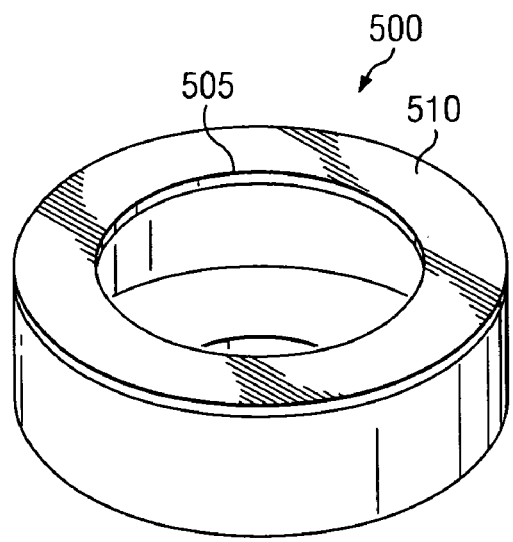
FIG. 5b is an isometric view of a reservoir in a preferred embodiment of the present invention.

Referring to FIG. 5b, reservoir 500 has faceplate 510. Faceplate 510 has single hole 505. Hole 505 allows water to flow through faceplate 510 in a single stream, similar to a fountain. Diameter of hole 505 can range between approximately 1 cm to 6 cm. The remainder of faceplate 510 has a layer of water that forms from the water exiting hole 505 before flowing off faceplate 510. The arrangement of one hole 505 will create a single stream of water.

Figure 5C:
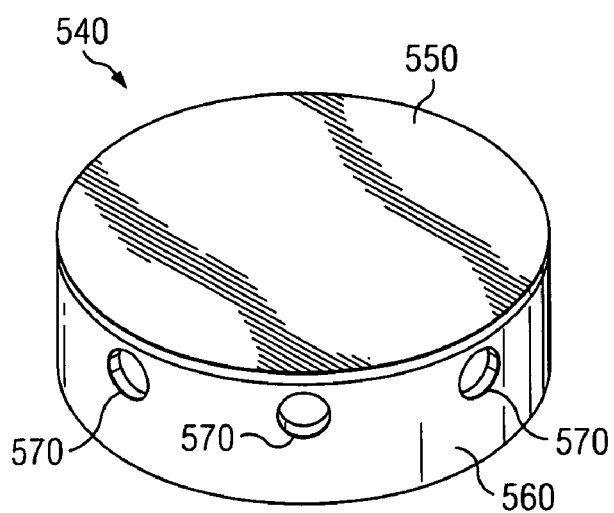
FIG. 5c is an elevation of a reservoir in a preferred embodiment of the present invention.

Referring to FIG. 5c, in this alternative preferred embodiment, reservoir 540 has faceplate 550 and wall 560. Wall 560 has holes 570 which allow water to flow from the side of reservoir 540. The number of holes 570 can range between approximately 2 to 25 holes and can either be arranged in a predetermine pattern or in random pattern. This arrangement allows for the water to flow out the side of reservoir 540 in horizontal fashion. As one skilled in the art will realize, the greater the number of holes 570 the lower the pressure of the stream of water from each hole 570 for any given flow rate.

Figure 5D:
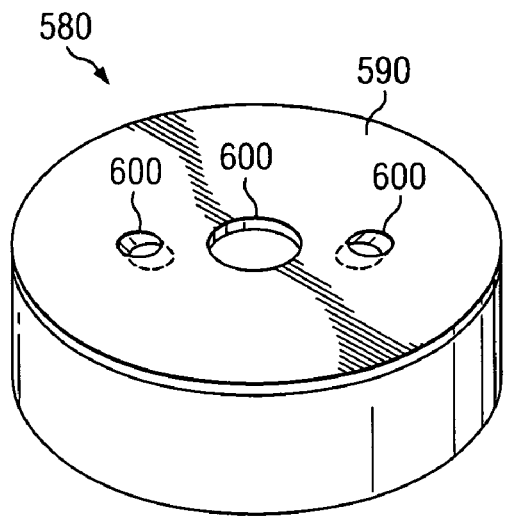
FIG. 5d is an isometric view of a reservoir in a preferred embodiment of the present invention.

Referring to FIG. 5d, in this preferred embodiment, reservoir 580 has faceplate 590. Faceplate 590 has holes 600. Holes 600 can be arranged in a random pattern or in a predetermined pattern. Number of holes 600 can range from approximately 2 to 10. The diameter of holes 600 can range between approximately 2 mm to 4 cm. Notably, in this embodiment, the holes are of different diameter. Also notably, the holes are bored at different angles allowing for a predetermined direction of water flow. Number of holes 600 of between 2 and 4 will allow the water flowing from holes 600 to have a "fountain like" characteristic. The remainder of faceplate 590 allows the water to collect before flowing off of faceplate 590 creating a water layer on top of faceplate 590 from which the pet can drink.

Figure 5E:
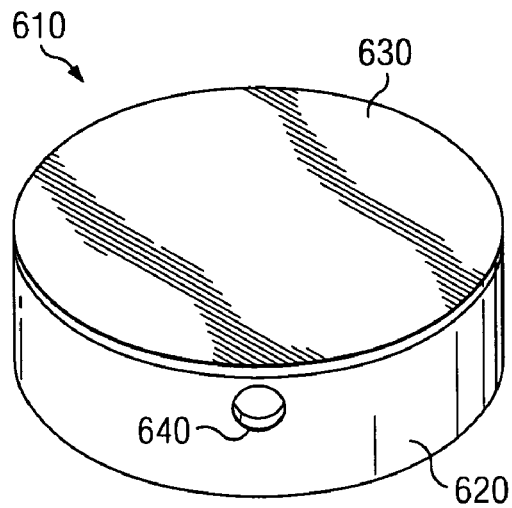
FIG. 5e is an isometric view of a reservoir in a preferred embodiment of the present invention.

Referring to FIG. 5e, in this alternative preferred embodiment, reservoir 610 has faceplate 630 and wall 620. Wall 620 has a single hole 640 which allows water to flow from reservoir 610. This arrangement allows for the water to stream out the side of reservoir in horizontal motion from the side of reservoir 610.

Figure 5F:
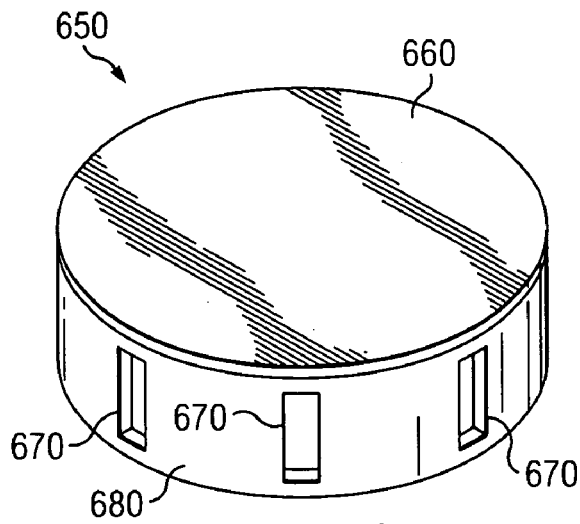
FIG. 5f is an isometric view of a reservoir in a preferred embodiment of the present invention.

Referring to FIG. 5f, in this alternative preferred embodiment, reservoir 650 has faceplate 660 and wall 680. Wall 680 has slots 670 which allow water to flow from the side of reservoir 650. Slots 670 are approximately rectangular is shape with a height of between 2 mm to 4 mm and a width of between 1 mm and 10 mm. The number of slots 670 can range between approximately 1 to 20 slots and can either be arranged in a pre-determine pattern or in random pattern. This arrangement allows for the water to flow from the side of the reservoir in a "waterfall" effect. The more slots 670 the less strength of the stream of water from each slot 670.

Figure 5G:
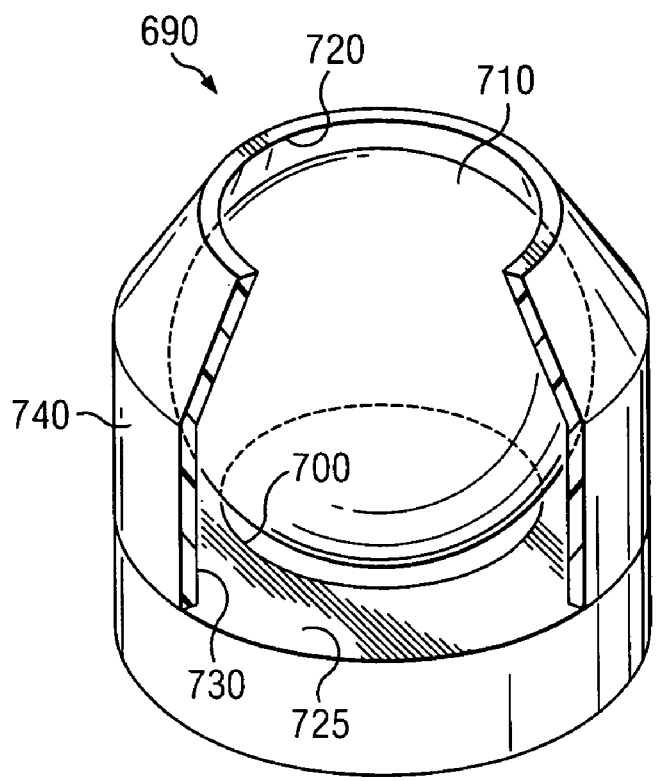
FIG. 5g is an isometric view of a reservoir in a preferred embodiment of the present invention.

Referring to FIG. 5g, in the alternative preferred embodiment, reservoir 690 has floor 725, wall 740, and hole 720. Wall 740 extends generally perpendicularly from perimeter of floor 725 for approximately 1 cm to 7 cm. Wall 740 then extends frustoconically toward the center of reservoir 690 at an angle of between about 25° and about 65° ending in hole 720. Thickness of wall 740 is between 0.5 mm and 10 mm. Channel 730 is provided within reservoir 690. Within channel 730 is ball 710. Diameter of ball 710 will be greater than both hole 720 and hole 700 such that ball 710 will not fall out of reservoir 690.

In practice, when water enters reservoir 690 through hole 700, ball 710 will be forced upward toward hole 720. The pet will be able to push ball 710 down into channel 730 allowing water to flow and pet to drink. By including ball 710, the pet not only is able to drink fresh water, but also have a toy with which it can play. In a further preferred embodiment, the ball is constructed of a phosphorescent plastic, providing a source of light to locate the invention in the dark.

Figure 5H:
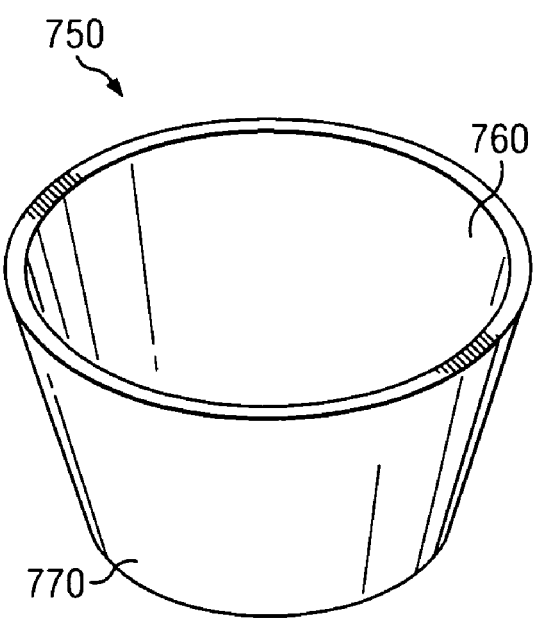
FIG. 5h is an isometric view of a reservoir in a preferred embodiment of the present invention.

Referring to FIG. 5h, reservoir 750 has walls 770. Walls 770 extend frustoconically upward at an angle of about 100° and about 134° from the base of reservoir 750 forming channel 760. Walls 770 have a thickness of between 0.5 mm and 10 mm. This creates a bowl shape from which the pets can drink. As the water flows, it will overflow walls 770 and flow into the sink below.

Figure 6:
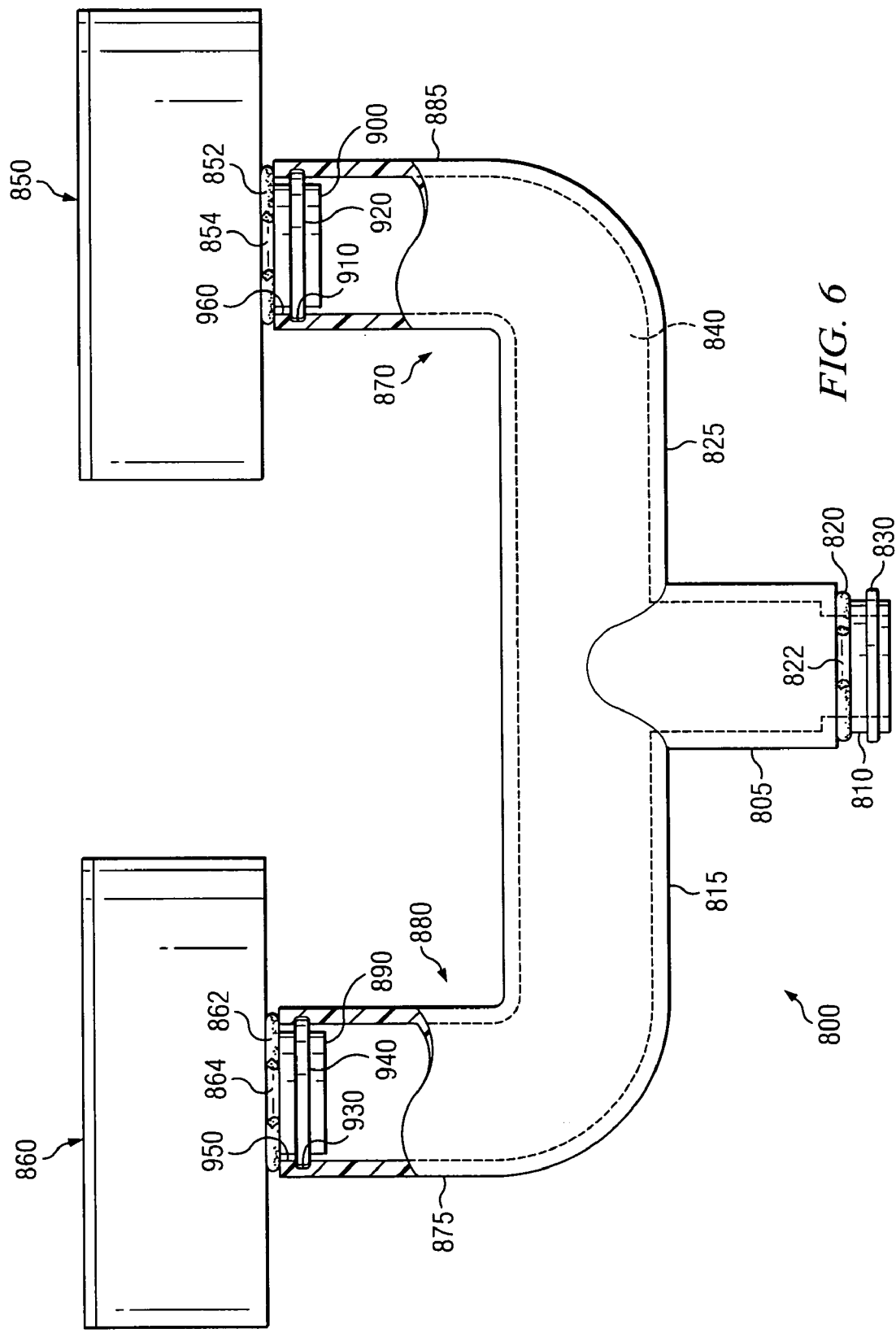
FIG. 6 is a plan view of a reservoir in a preferred embodiment of the present invention.

Referring then to FIG. 6, in another preferred embodiment, reservoir 800 allows for two animals to drink at the same time. Reservoir 800 has end 810 with o-ring 820 and extension 830. O-ring 820 fits in annular groove 822. End 810 functions similarly to end 480 as described in FIG. 2.

Reservoir 800 has leg 805 which is connected to end 810. Leg 805 extends upward and then branches into two 90° angles toward opposite directions, creating leg 815 and leg 825. Leg 815 then bends at an approximate 90° angle, and creates leg 875. Leg 815 and leg 875 form elbow 880. Leg 825 bends at an approximate 90° angle and creates leg 885. Leg 825 and leg 885 form elbow 870. Leg 875 and leg 885 are parallel to leg 805.

Channel 840 traverses the length of leg 805, 815, 825, 875, and 885 and bends consistent with the bends of these legs. Channel 840 has exit 950 at end of elbow 880 and exit 960 at end of elbow 870. Affixed to end of elbow 880 is reservoir 860 and affixed to end of elbow 870 is reservoir 850.

Reservoir 860 has end 890. End 890 has extension 940 and o-ring 862. O-ring 862 fits in annular groove 864. Channel 840 has recess 930 in wall of channel 840 between approximately 1 mm and 10 mm from exit 950. Extension 940 fits within recess 930. Recess 930 does not extend past walls of elbow 880. O-ring 862 is situated so as to create a seal between reservoir 860 and elbow 880 when end 890 is placed inside channel 840 and extension 940 is within recess 930.

Reservoir 850 has end 900. End 900 has extension 920 and o-ring 852. O-ring 852 fits in annular groove 854. Channel 840 has recess 910 in wall of channel 840 between approximately 1 mm and 10 mm from exit 960. Extension 920 fits within recess 910. Recess 910 does not extend past walls of elbow 870. O-ring 852 is situated so as to create a seal between reservoir 850 and elbow 870 when end 900 is placed inside channel 840 and extension 920 is within recess 910.

Extensions 940 and 920 and recesses 930 and 910 can be designed similar to those described in FIGS. 3a and 3b.

Reservoirs 860 and 850 can have any of the designs described in FIGS. 5a through 5h. Further, reservoir 860 and 850 can have different designs depending on the choice of owner and preference of the pet.

Figure 7:
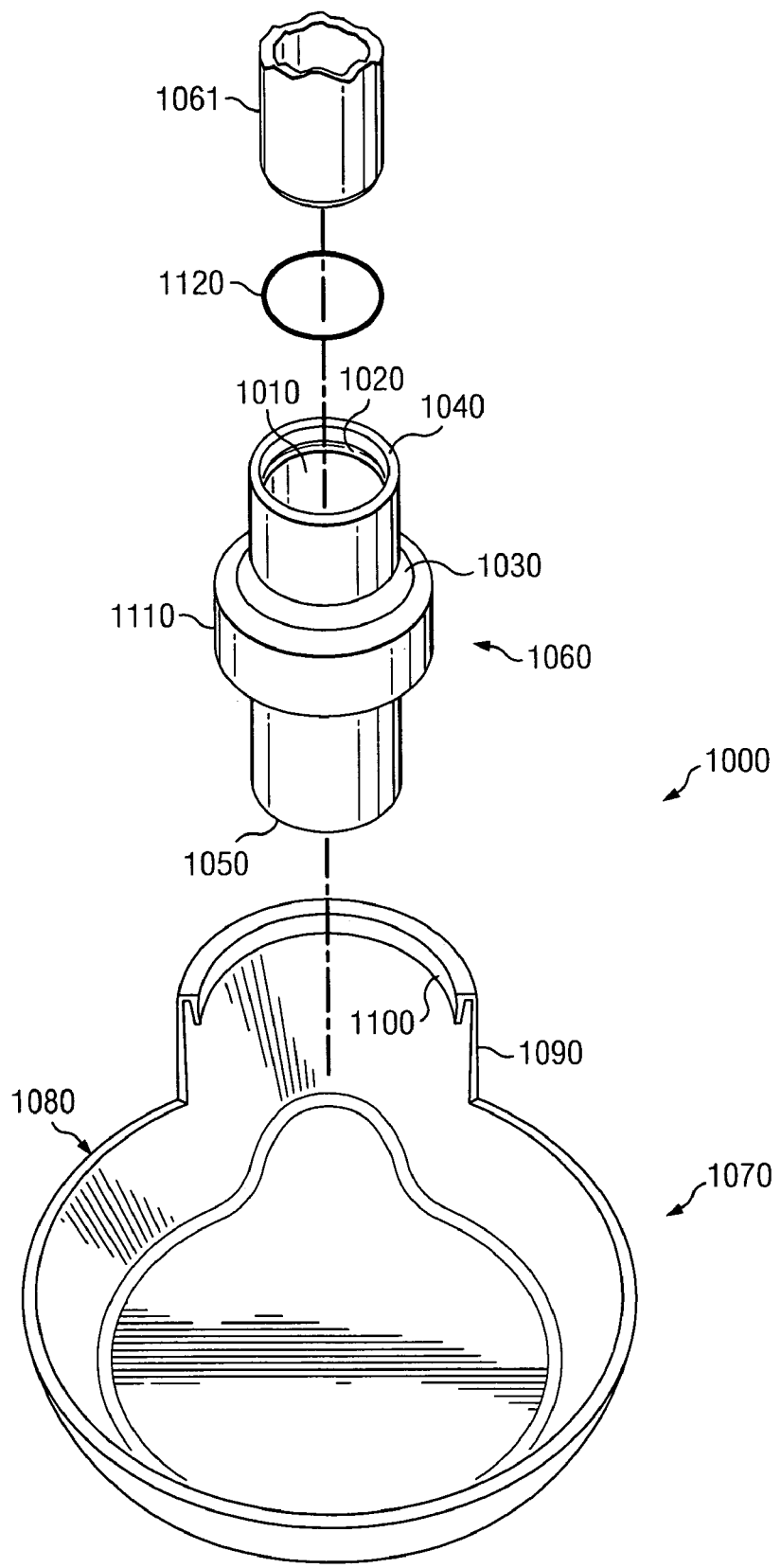
FIG. 7 is an exploded view of a preferred embodiment of the present invention.

Referring to FIG. 7, an alternate embodiment is described. Spout 1000 includes connector 1060 and reservoirs 1070. Connector 1060 includes channel 1010 which traverses the length of connector 1060. The channel 1010 includes entrance 1040 and exit 1050. Embedded in the inside wall of channel 1010 is annular recess 1020. In one preferred embodiment annular recess 1020 is between 0.1 cm and 0.5 cm in depth and annular recess 1020 is located between approximately 0.1 cm and 1 cm from entrance 1040.

O-ring 1120 is fitted in annular recess 1020. The dimensions of o-ring 1120 are sufficient to create a press fit between o-ring 1120 and the outside diameter of faucet 1061.

Connector 1060 includes extension 1110 extending circumferentially from the exterior surface of the connector 1060. In one preferred embodiment, extension 1110 has an outside radius of between 3 mm and 10 mm greater than the connecter and has a height between 1 mm and 10 mm and has a height of between 1 mm and 10 mm. Extension 1110 has annular indention 1030 located on its top surface.

Reservoir 1070 includes bowl 1080 and wall 1090. Wall 1090 is generally shaped as a half-cylinder and includes semi-circular hook 1100. In one preferred embodiment, wall 1090 has a height of between 0.5 cm and 4 cm. Semi-circular hook 1100 extends from wall 1090 and forms a mating connector with annular indention 1030. The fit between semi-circular hook 1100 and extension 1110 should be snug but allow for removability.

Wall 1090 is connected to bowl 1080. Bowl 1080 in the preferred embodiment is of general oval shape. However, bowl 1080 can have other decorative shapes, such as but not limited to outlines of animals, flora, fauna, or food.

In one preferred embodiment, the interior of bowl 1080 has a depth of between 0.5 cm and 5 cm while the outside depth of bowl 1080 is between 0.5 cm and 7 cm. The interior of bowl 1080 in the preferred embodiment is smooth; however, it can be imprinted with decorative designs, such as but not limited to facial imprints of cat, scale imprints of fish, or flower petals. Additionally, bowl 1080 can be a variety of colors depending on the decorative design desired.

In another preferred embodiment, connector 1060 and reservoir 1070 can be manufactured as a single integral unit such that reservoir 1070 is not removable from connector 1060.

Figure 8:
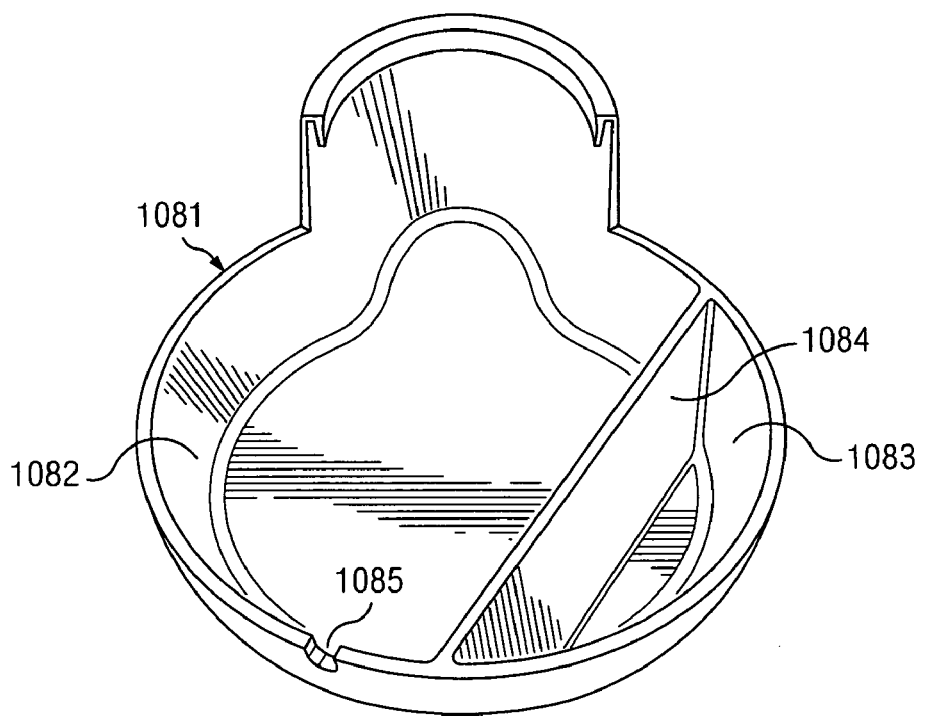
FIG. 8 is a plan view of a bowl in a preferred embodiment of the present invention.

In another embodiment shown in FIG. 8, bowl 1081 can have two chambers, 1082 and 1083 segregated by a wall 1084. Chamber 1083 can dispense other consumable items to be dispensed such as food or medicines. Bowl 1081 can also include drain 1085 located on the wall of chamber 1082.

Drain 1085 has a generally semi-circular shape removed from the wall of chamber 1082 and directs the flow of water from chamber 1082 such that the consumable items in chamber 1083 do not become wet. The radius of drain 1085 is no more than half the height of the wall of chamber 1082.

Figure 9:
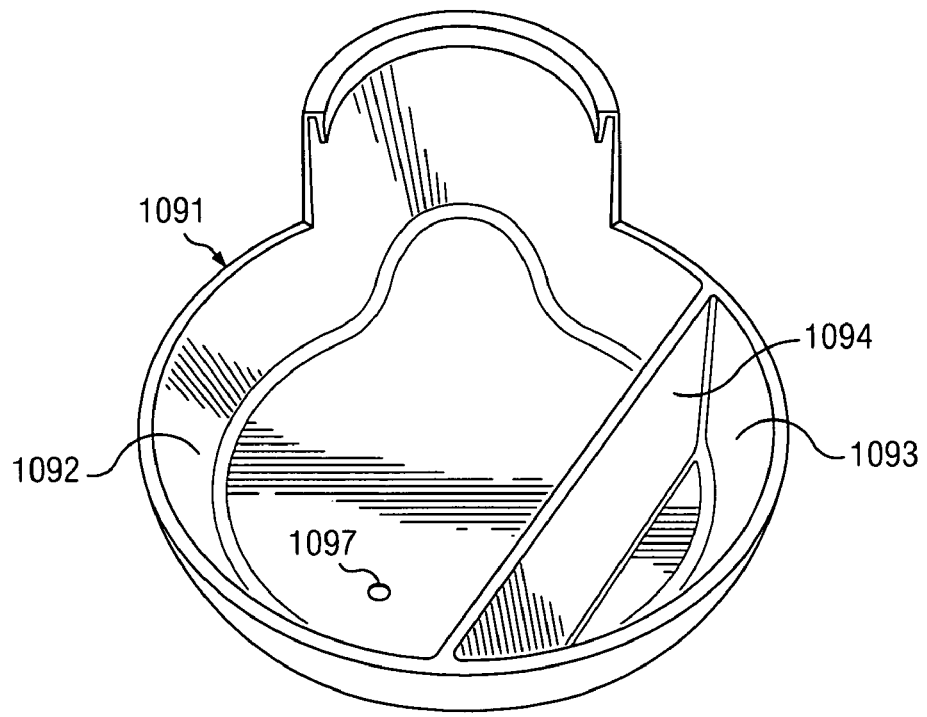
FIG. 9 is a plan view of a bowl in a preferred embodiment of the present invention.

Referring to FIG. 9, in another embodiment of the preferred invention, bowl 1091 has two chambers, 1092 and 1093 segregated by wall 1094. Chamber 1093 can dispense other consumable items to be dispensed. To prevent water from crossing wall 1094 and wetting chamber 1093, hole 1097 is removed from the bottom of chamber 1092. The size of hole 1097 can range from between 0.5 mm to 3 mm.

Returning to FIG. 7, in practice, connector 1060 is attached to reservoir 1070 by sliding semi-circular hook 1100 into annular indention 1030 and positioning bowl 1080 in front of faucet 1061. Connector 1060 is attached to faucet 1061 by placing entrance 1040 over the faucet and applying a vertical axial pressure to connector 1060 until o-ring 1120 seats on faucet 1061.

After attachment of connector 1060 to the faucet, a spigot (not shown) is opened and water is allowed to flow through channel 1010 and out exit 1050 into reservoir 1070. As the water flows, reservoir 1070 will fill and overflow bowl 1080 into the sink below.

In a preferred embodiment, reservoir 1070 can be rotated around connector 1060 to place bowl 1080 into different preferred locations from which the pet can drink.

As will be apparent to one of skill in the art, the invention has the advantage that the water flow through spout 1000 can be very slow and can be left flowing for long periods of time. This allows the pet to drink at any time it so chooses. Further, if the embodiment that includes a chamber for food, the pet can be fed with one chamber and have fresh water available at a single location for several days.

The invention also provides the advantage of disassembly between connector 1060 and reservoir 1070 to allow for cleaning and storage of the separate components.

Further advantages include that the device can be made from easily available plastic materials, including but not limited to acrylonitrile-butadiene-styrene (ABS), poly-vinyl-chloride (PVC), polypropylene. Reservoir 1070 can be made from PVC, polypropylene or other plastics or metals, such as stainless steel or cast aluminum.

It will be appreciated by those skilled in the art that changes could be made to the embodiments described above without departing from the broad inventive concept. It is understood, therefore, that this invention is not limited to the particular embodiments disclosed, but it is intended to cover modifications within the spirit and scope of the present invention as defined by the appended claims.

The invention claimed is:

1. A pet watering device for attachment to a faucet for the collection of flowing water comprising:
   an adapter removably attached to and in ducted communication with the faucet;
   the adaptor having a circular connection track circumscribing the exterior of the adapter;
   a bowl having a semicircular flange extending upwardly from said bowl, said flange being removably connected within the circular connection track permitting rotation of the bowl;
   the bowl having a reservoir in ducted communication with the adapter; wherein water from the faucet flows through the adapter and collects in the reservoir to water the pet.

2. The pet watering device of claim 1 wherein the reservoir includes a spillway adjacent the reservoir.

3. The pet watering device claim 1 wherein the adaptor includes an annular indention on an inside surface; and a flexible seal contained in the annular indention and adjacent to the faucet.

4. The pet watering device of claim 1: wherein the adaptor includes a spout in ducted connection with the faucet and the reservoir.

5. The pet watering device of claim 1, wherein the circular connection track of the adaptor provides a mating surface that receives the semicircular flange of the bowl therein.

6. The pet watering device of claim 5, wherein the circular connection track and the semicircular flange have identical radii of curvature.

7. The pet watering device of claim 1, wherein adaptor includes a water duct, the circular connection track encircling the water duct.

8. The pet watering device of claim 1, wherein the semicircular flange is positionable in an infinite number of positions within the circular connection track.

9. A pet watering device for attachment to a faucet and for collection of flowing water comprising:
   an adaptor having an inside wall, an outside wall and a channel in ducted communication with the faucet; the inside wall including annular indention and a channeling nozzle, the outside wall having a circular attachment recess circumscribing the exterior of the adapter;
   a mechanical seal seated in the annular indention and in frictional connection with the faucet;
   a bowl having a reservoir and a semi-circular connection flange extending upwardly from said bowl; the semi-circular connection flange rotatably connected to the circular attachment recess; the channeling nozzle directed toward the reservoir; wherein water from the faucet flows through the adaptor and is directed by the channeling nozzle into the reservoir.

10. The pet watering device of claim 9 wherein the mechanical seal is a rubber o-ring.

11. The pet watering device of claim 9 wherein the reservoir includes a spillway.

12. The pet watering device of claim 9 wherein the reservoir includes a generally concave depression in ducted communication with the faucet.

13. The pet watering device of claim 9, wherein the circular attachment recess of the adaptor provides a mating surface that receives the semi-circular connection flange of the bowl therein.

14. The pet watering device of claim 13, wherein the circular attachment recess and the semi-circular connection flange have identical radii of curvature.

* * * * *